United States Patent
Dash et al.

(10) Patent No.: US 9,171,145 B2
(45) Date of Patent: Oct. 27, 2015

(54) PROTECTING CRYPTOGRAPHIC SECRETS USING FILE SYSTEM ATTRIBUTES

(71) Applicant: SYMANTEC CORPORATION, Mountain View, CA (US)

(72) Inventors: Sambit Dash, Bangalore (IN); Ramanath Pai, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 13/902,194

(22) Filed: May 24, 2013

(65) Prior Publication Data

US 2014/0351587 A1 Nov. 27, 2014

(51) Int. Cl.
 H04L 29/06 (2006.01)
 G06F 21/44 (2013.01)
 H04W 12/04 (2009.01)

(52) U.S. Cl.
 CPC ............ *G06F 21/44* (2013.01); *H04L 63/0838* (2013.01); *H04W 12/04* (2013.01); *H04L 63/0869* (2013.01); *H04L 2463/062* (2013.01)

(58) Field of Classification Search
 CPC . G06F 21/6218; G06F 21/44; H04L 63/0838; H04L 63/0869
 USPC ........................................................ 713/165
 See application file for complete search history.

(56) References Cited

U.S. PATENT DOCUMENTS

| | | | |
|---|---|---|---|
| 5,953,419 A * | 9/1999 | Lohstroh et al. ............... | 713/165 |
| 6,026,167 A * | 2/2000 | Aziz ................................ | 380/28 |
| 7,953,967 B2 * | 5/2011 | Ishikawa et al. ................. | 713/2 |
| 8,751,804 B1 * | 6/2014 | Nystrom et al. .............. | 713/168 |
| 8,880,879 B2 * | 11/2014 | Chew ............................. | 713/165 |
| 2003/0081784 A1 * | 5/2003 | Kallahalla et al. ............. | 380/277 |
| 2005/0273858 A1 * | 12/2005 | Zadok et al. ..................... | 726/24 |
| 2007/0030972 A1 * | 2/2007 | Glick et al. .................... | 380/258 |
| 2007/0250540 A1 * | 10/2007 | Hsu ............................... | 707/200 |
| 2008/0046732 A1 * | 2/2008 | Fu et al. ......................... | 713/171 |
| 2008/0065909 A1 * | 3/2008 | Chen ............................. | 713/193 |
| 2008/0130899 A1 * | 6/2008 | Iwamoto et al. .............. | 380/278 |
| 2008/0172556 A1 * | 7/2008 | Ishikawa et al. ................. | 713/2 |
| 2011/0167276 A1 * | 7/2011 | Courtay ........................ | 713/189 |
| 2012/0036370 A1 * | 2/2012 | Lim et al. ...................... | 713/189 |
| 2012/0240204 A1 * | 9/2012 | Bhatnagar et al. ................. | 726/5 |
| 2012/0297183 A1 * | 11/2012 | Mukkara et al. .............. | 713/153 |
| 2013/0086324 A1 * | 4/2013 | Soundararajan et al. ..... | 711/122 |

(Continued)

OTHER PUBLICATIONS

Seagrave, S. "VMware ESX 'I moved it' or 'I copied it'—What's the Difference?", Jun. 7, 2010, http://techhead.co/vmware-esx-i-moved-it-or-i-copied-it-whats-the-difference/.

*Primary Examiner* — David Garcia Cervetti
(74) *Attorney, Agent, or Firm* — Patterson & Sheridan, LLP

(57) ABSTRACT

Techniques are disclosed for protecting cryptographic secrets stored locally in a device, such as a mobile phone. A client device creates or downloads a shared secret to be used in a server transaction. To protect this shared secret locally, the client device encrypts the shared secret using a key generated a file system attributes value, along with other sources of entropy. The file system attributes value may correspond to the inode of a file in a UNIX-based file system. Thereafter, when the shared secret is required for logical computation, the client device reconstructs the key using the file system attributes value and the other previous sources of entropy. The client device may use the key to decrypt the information and use the shared secret for its required purpose, e.g., in generating a one-time password for a login session.

18 Claims, 6 Drawing Sheets

(56) References Cited

U.S. PATENT DOCUMENTS

| | | | |
|---|---|---|---|
| 2013/0111217 A1* | 5/2013 | Kopasz et al. | 713/189 |
| 2013/0163764 A1* | 6/2013 | van den Berg et al. | 380/278 |
| 2014/0047244 A1* | 2/2014 | Buswell | 713/190 |
| 2014/0108786 A1* | 4/2014 | Kreft | 713/156 |
| 2015/0074398 A1* | 3/2015 | Cullen et al. | 713/168 |

* cited by examiner

PROTECTING CRYPTOGRAPHIC SECRETS USING FILE SYSTEM ATTRIBUTES

BACKGROUND

1. Field

Embodiments disclosed herein generally relate to techniques for preventing the cloning of cryptographic secrets, particularly on mobile devices. More specifically, techniques are disclosed for encrypting shared secrets using file system attributes.

2. Description of the Related Art

Protecting encrypted data is a well-known issue in numerous contexts. For instance, a server application and the client device may possess a shared secret, such as a data credential or a symmetric key. The server application and client device may use this shared secret in authentication transactions to validate the identity of the client device or of an associated user of the device. For example, a server application and a client device may later use the shared secret to generate a one-time password or create another unique key during a login session. Alternatively, the client and the server may use the shared secret in a challenge-response method of authentication. Thus, because the shared secret is used in these secure authentications, it is important to protect it from being compromised by a malicious user. As one approach to protect the shared secret, the client device generates an encryption key using various sources of entropy (the randomness collected by an operating system or application for use in cryptography), such as the device ID, the CPU ID, keyboard timings, and the like. The client device uses the encryption key to secure the shared secret. If a client device later requires access to the shared secret for logical computation, the device reconstructs the key using the same sources used and decrypts the data.

However, in some cases, a malicious user can access the shared secret by reconstructing the key. The malicious user may do this by using a cloning application to copy data from the client device (including the encrypted shared secret and the sources used to secure the shared secret) and mimic the client device. Because all of the sources of entropy used to create the key are present in the cloning device, the malicious user has all of the required items to recreate the encryption key. Thereafter, the malicious user may use the reconstructed key to decrypt the shared secret. Alternatively, instead of reconstructing the key directly, in addition to copying the encrypted shared secret data from the client device, the cloning application may copy the code used to generate the key (in addition to the shared secret data) and run the code to reconstruct the key. At any rate, once the shared secret has been compromised, the malicious user may be able to use the data in server transactions. Such breaches in security result in weak device and user authentication, and therefore, approaches that prevent a malicious user from decrypting shared secrets through cloning are necessary to maintain strong authentication.

SUMMARY

One Embodiment presented herein is a method for protecting a shared secret. This method may generally include generating, by operation of a processor, a key based on a file system attribute of a file stored in a file system of a computing device, where the file system attribute of the file is distinct relative to files stored in the file system. This method may also include encrypting the shared secret with the key and storing the encrypted shared secret in a storage memory on the computing device.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
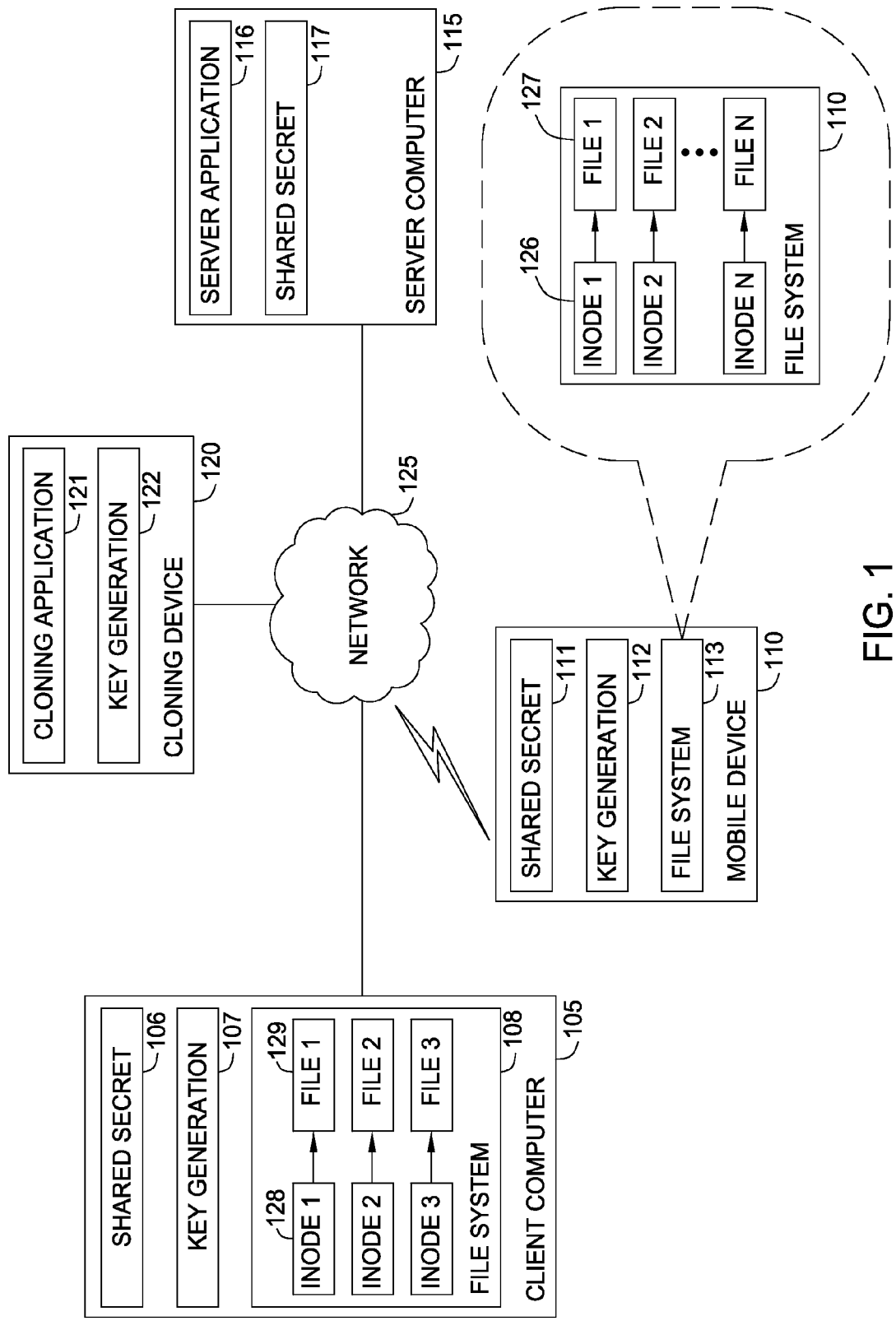
FIG. 1 illustrates an example computing environment, according to one embodiment.

Embodiments presented herein provide techniques for protecting cryptographic secrets in a device using local file system attributes, such as the inode of a file in a UNIX-based file system. That is, the disclosed techniques allow a client device to safeguard an encrypted shared secret (e.g., a data credential, symmetric key, etc.) without the aid of a server by encrypting the shared secret with a key generated with the file system attributes of the device (among other entropy sources). For example, using the inode number of a file prevents a cloning application from being able to reproduce the key on another device. Even if a cloning application is able to copy or recreate client device data and applications on another device, the disclosed techniques prevent the cloning application from successfully replicating the encryption key because file system attribute values in the system are unique to the original device and difficult to reproduce elsewhere.

In one embodiment, a client device application creates a shared secret or receives the shared secret from a server over a secure communication. This shared secret may be a symmetric key, data credential, password, etc. At this point, the shared secret may be susceptible to retrieval from malicious users, and because the shared secret may be used in subsequent server interactions, the client device may encrypt the shared secret to protect it. To do so, the client device may be configured to generate a key using a file system attributes value, among other sources of data entropy.

In one embodiment, the value used to encrypt the shared secret (or other credential) for storage on the local device may be an inode number of a file, e.g., the file storing the shared secret itself. As is known, in a UNIX-based file system, an inode is a data structure that stores metadata information about a file system object, such as the file owner, file permissions, the date the file was modified, and the like. Every file in the system has an associated inode, and each inode is assigned a distinct integer number. The inode number remains the same even if the file is moved. Copying (or recreating) the file results in a new file, and accordingly, the file system creates a new inode data structure with a different inode number. Once the client device has encrypted the shared secret, the device stores the encrypted data locally. Thereafter, if the client device requires the shared secret for use in logical computation (such as in a key derivation function, authentication by generating a one-time password, or authentication by a challenge-response process, etc.), the client device may reconstruct the key using the same sources, including the inode number, originally used to create the key.

This approach may prevent a cloning application from replicating the key. Because the inode number of a file changes when the file is copied or recreated, using the inode of a file copied onto another device may result in a different key being generated. Even if the cloning application was able to successfully mimic the client device and generate a key, the application cannot recreate the same key used to encrypt the data because the inode number changes when the file is copied to the cloning device. Additionally, the inode is a read-only entity, so a malicious user cannot manipulate the number without great difficulty, because tampering with the inode involves kernel debugging, a non-trivial task. Further, because the client device generates the key locally, no server interaction is required. This allows for flexible implementation on a client device. This also means that the encryption key is expected to remain the same during the life cycle of the device.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

In the following, reference is made to an inode assigned to files used as a source of entropy to encrypt shared secret data. Such reference is made to demonstrate the inode as one type of file system attribute that may be used to protect against cloning data on a device. Other file system attributes that are local and unique to the device may be used for the techniques disclosed herein, such as a file device ID, file user ID, a file group ID, file modes, etc. Because these file attributes are local and unique to the device, they provide added layers of randomness to the key generation, resulting in a key that is difficult for a cloning application to replicate.

FIG. 1 illustrates an example computing environment 100, according to one embodiment. The computing environment 100 allows a client device, such as a client computer 105 or a mobile device 110, to encrypt a credential shared with a server computer 115. As shown, the computing environment includes a server computer 115 hosting a computing resource (e.g., application/service 116). The server computer 115 may be a physical computing system (e.g., a system in a data center) or may be a virtual computing instance executing within a computing cloud. In any event, the server computer 115 hosts an application/service 116 accessed by clients using a client device. The applications/service 116 may create a shared secret 117 for use with the client device (such as for authentication purposes), and the shared secret 117 is only known by the client device and the server computer 115.

Mobile device 110 generally represents a tablet, smartphone, or other portable computing device that can connect to a computing network. As shown, mobile device 110 includes a shared secret 111, a key generation component 112, and a file system 113. A file system 113 includes one or more files 127. In some embodiment, e.g., a mobile phone or tablet running the Android® mobile operating system, each file 127 has a unique inode 126. Although the file retains its corresponding inode 126 after being moved or overwritten, if the file 127 is copied (or otherwise recreated on the file system of the cloning device 120), then the file system on the cloning device 120 assigns the resulting new file an inode. In one embodiment, to encrypt shared secret 111, the key generation component 112 creates a key using various sources of entropy, with one source being the inode 126 of a file 127, and encrypts the data. Using the inode 126 as a primary source of entropy prevents the same key being generated on cloning device 120, because the inode 126 of a file 127 changes upon being copied. That is, while the cloning device 120 may be configured to masquerade as the mobile device 110 (or client device 105), the cloning device 120 may not be able to clone the same inode used to encrypt the shared secret. Once the shared secret is encrypted, the mobile device 110 stores the encrypted data locally. When the mobile device 110 later requires the shared secret 111 for use in logical computation (e.g., in generating a one-time password with the server computer 115 via the network 125), the key generation component 112 reconstructs the key using the same sources on the mobile device 110 used to secure the encrypted data.

Another example of a client device is a client computer 105. Similar to the mobile device 110, a client computer 105 includes a key generation component 107 and a file system 108. It may obtain a shared secret 106 from the server computer 115 via the network 125. In one embodiment, the client computer 105 may correspond to a UNIX-based system, and accordingly the key generation 107 creates a key using an inode 128 of a file 129 as a source of entropy to encrypt shared secret 106.

A cloning device 120 may be present in the computing environment 100, connected to the network 125. Using a cloning application 121, the cloning device 120 may reproduce (e.g., through copying or rewriting to new files) shared secrets, application data, source code, and the like from a client device such as from mobile device 110. The cloning application 120 may mimic the client device with this data. Using the key generation component 120, the cloning device may create keys using the data obtained from other devices and decrypt the shared secrets by using the reproduced keys. However, the key generation component 120 fails to reconstruct a key to decrypt shared secrets encrypted using file system attributes, such as an inode 126 of file 127 from mobile device 110. That is, when the cloning device copies a file 127, its corresponding inode 126 changes. Therefore, keys generated using the inode of the shared secret, as stored on cloning device 127, will be different from the original key used to secure a shared secret. For example, assume that mobile device 110 encrypts a shared secret 111 using inode 126 of file 127 in file system 113. Further assume, that cloning application 121 was able to copy the shared secret 111 from mobile device 110 and all of the data in file system 113, including inode 126 and file 127. Copying the file 127 into the cloning device 120 actually creates a new file 127, resulting in a new inode 126. Therefore, if the key generation component 122 attempts to recreate the key used to secure shared secret 111, the resulting key will be different. Thus, the cloning device 120 may be unable to decrypt shared secrets though cloning methods.

Figure 2:
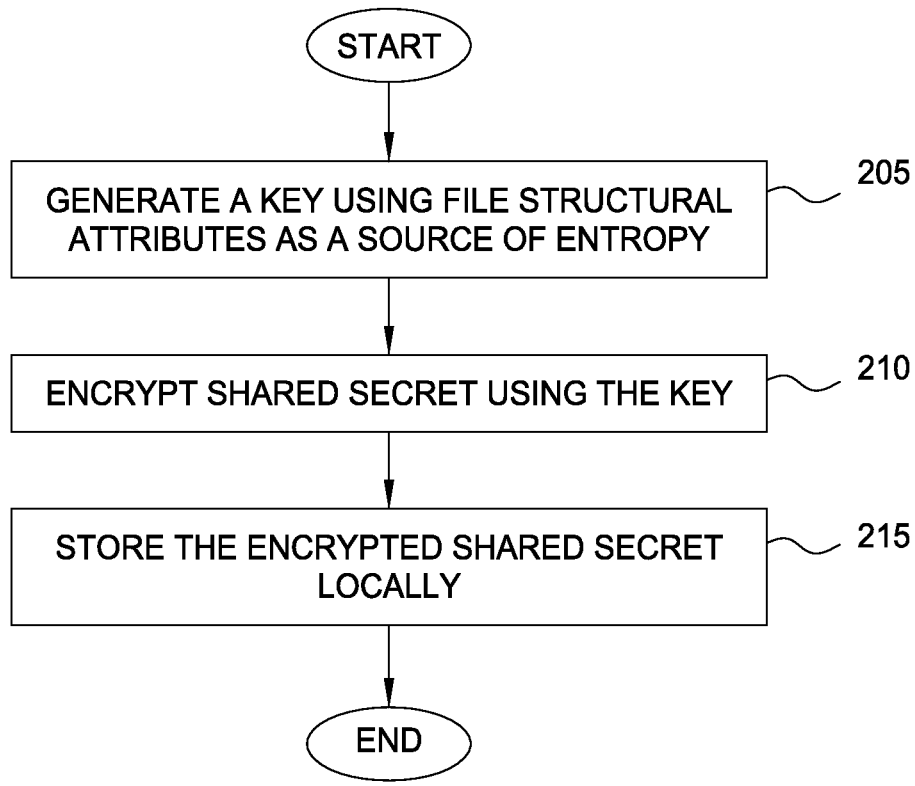
FIG. 2 illustrates a method for encrypting data by using file system attributes as an entropy source, according to one embodiment.

FIG. 2 illustrates a method 200 for encrypting data by using file system attributes, according to one embodiment. More specifically, method 200 illustrates the encryption process from the perspective of a client device, such as the client computer 105 or mobile device 110. Assume that the client device stores a shared secret in an encrypted format, using, at least in part, an inode value of the file storing the shared secret. As shown, the method 200 begins at step 205 when the key generation component of a client device creates a key using a file's inode (along with other sources of entropy). Note, the inode need not correspond to the encrypted credential or the application being used to encrypt the shared secret. Rather, the key generation component may use the inode of any file stored in the device. For example, the key generation component may use the inode of an executable or a driver in the file system. Any inode within the device may prevent the key from being reproduced on another device. However, because the key generation component uses the inode to reconstruct the key, it should not use a temporary file in the system. In addition to the inode, the key generation component may also include keyboard timings, the device's CPU ID, the device ID, and the like as entropy sources. At step 210, the client device encrypts the shared secret using the key.

At step 215, the client device stores the encrypted shared secret locally. Note, however, that the key is not stored, but rather later recreated using the same sources used to secure the shared secret. The shared secret remains encrypted and stored in the client device until it is required for later use, such as in creating additional unique keys or in generating a one-time password for use with a server application. In such cases, the client device may dynamically reconstruct the key and decrypt the shared secret.

Figure 3:
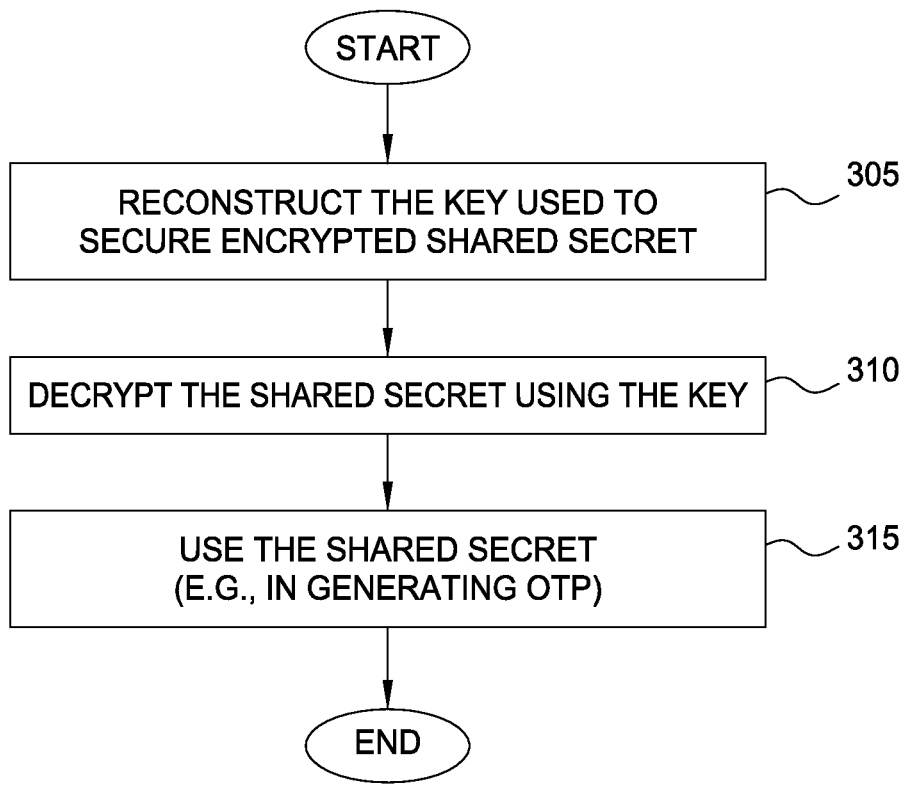
FIG. 3 illustrates a method for decrypting data that has been encrypted by using file system attributes as an entropy source from the device used to generate the encryption key, according to one embodiment.

FIG. 3 illustrates a method 300 for decrypting a shared secret such as a data credential or a symmetrical key that has been encrypted and stored in local memory using the method described in FIG. 2, according to one embodiment. Assume that this is from the perspective of the client device used to encrypt the shared secret, and that the client device requires access to the shared secret (e.g., for use in server authentication, in generating multiple unique keys from the shared secret, etc.). As shown, the method 300 begins at step 305, where the client device reconstructs the key used to secure the shared secret. To reconstruct this key, the key generation component of the client device uses the inode, as well as the other sources of entropy previously used, in encrypting the shared secret. Once the client device reconstructs the key, at step 310, the client device uses the key to decrypt the shared secret. At step 315, the client device uses the shared secret for its required purpose. For example, if the client device requires the shared secret to generate a one-time password for a login session with a server application, the device may perform logical computation with the shared secret in a manner that only the server knows to create the one-time password.

A cloning application on another device may be unable to perform the steps above. For example, assume that the cloning application is able to copy all of the data from the original device. This includes the encrypted shared secret and all of the entropy sources used to secure the shared secret. However, when the cloning application copies the file whose inode acts as a source, the inode of that file changes. Therefore, although the cloning device may mimic the activity of the original device, when the cloning device attempts to reconstruct the key using the copied sources, the resulting key may be unable to decrypt the shared secret. Working around this encryption may require manipulating the inode to maintain its original value. However, tampering with the inode number is a difficult problem that may require kernel debugging. Thus, the key generation by the cloning application invariably results in a key different from that generated by the client device. With the key being different from the one originally created, the contents of the encrypted data remain inaccessible to the other device.

Figure 4:
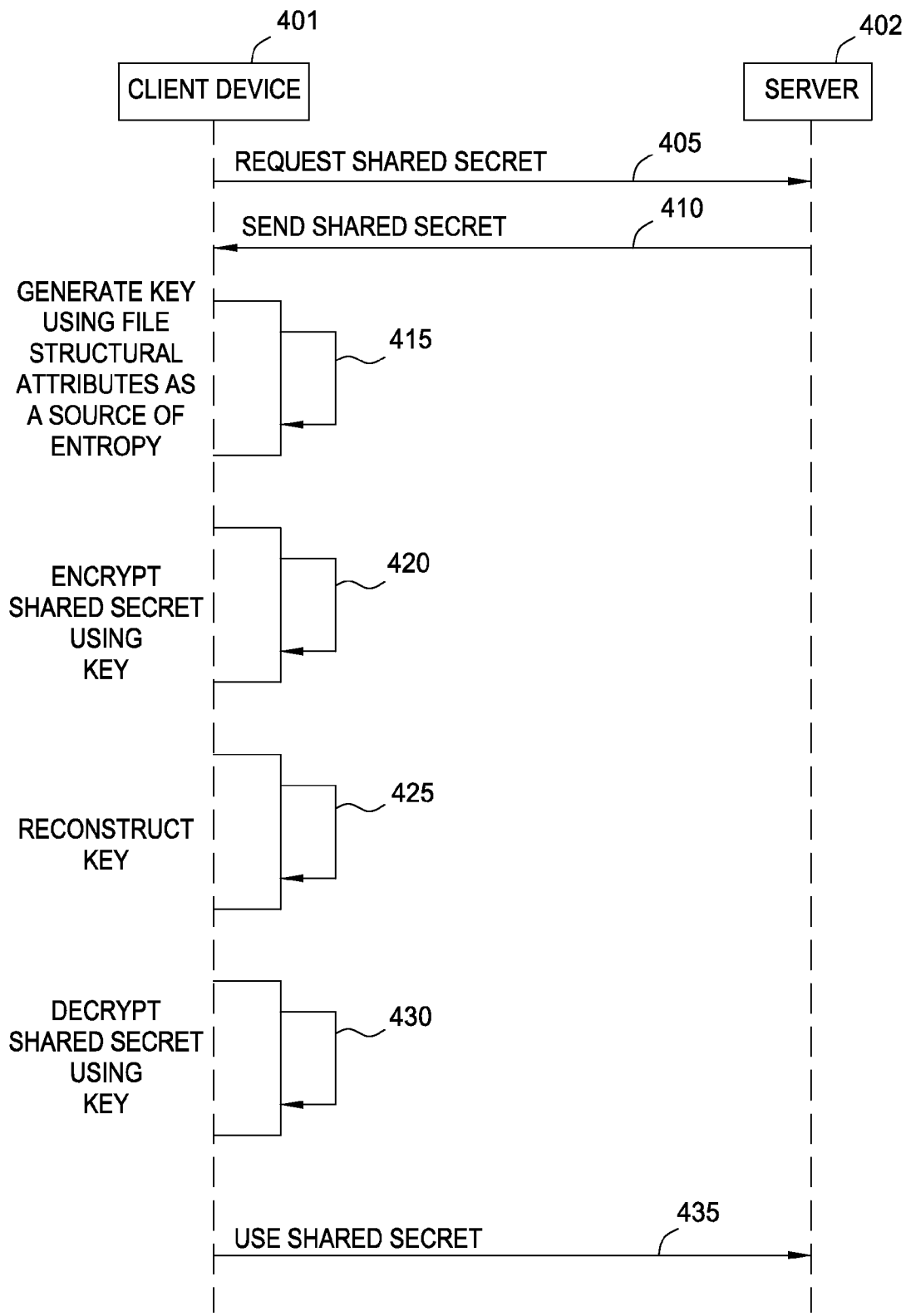
FIG. 4 illustrates a sequence diagram of an interaction between a client device and a server in creating a credential that a client device encrypts with a key generated by using file system attributes as an entropy source, according to one embodiment.

FIG. 4 illustrates a sequence diagram 400 of an interaction between a client device 401 and a server 402 in creating a credential that the client device 401 encrypts using file system attributes, according to one embodiment. As shown, a client device 401 requests a shared secret from server 402 (at 405). At 415, the client device 401 generates a key using an inode as an entropy source and at 420 encrypts the shared secret using the key. The client device 401 stores the encrypted shared secret locally (e.g., in a storage memory of the device) until required, upon which case, at 425, the client device 401 reconstructs the key using the same entropy sources, including the file system attributes. At 430, the client device decrypts the credential with the key. At 435, the client device 401 uses the credential for whatever purpose is required, e.g., generating a one-time password with the server 402, sending the shared secret in a challenge-response authentication, etc.

Figure 5:
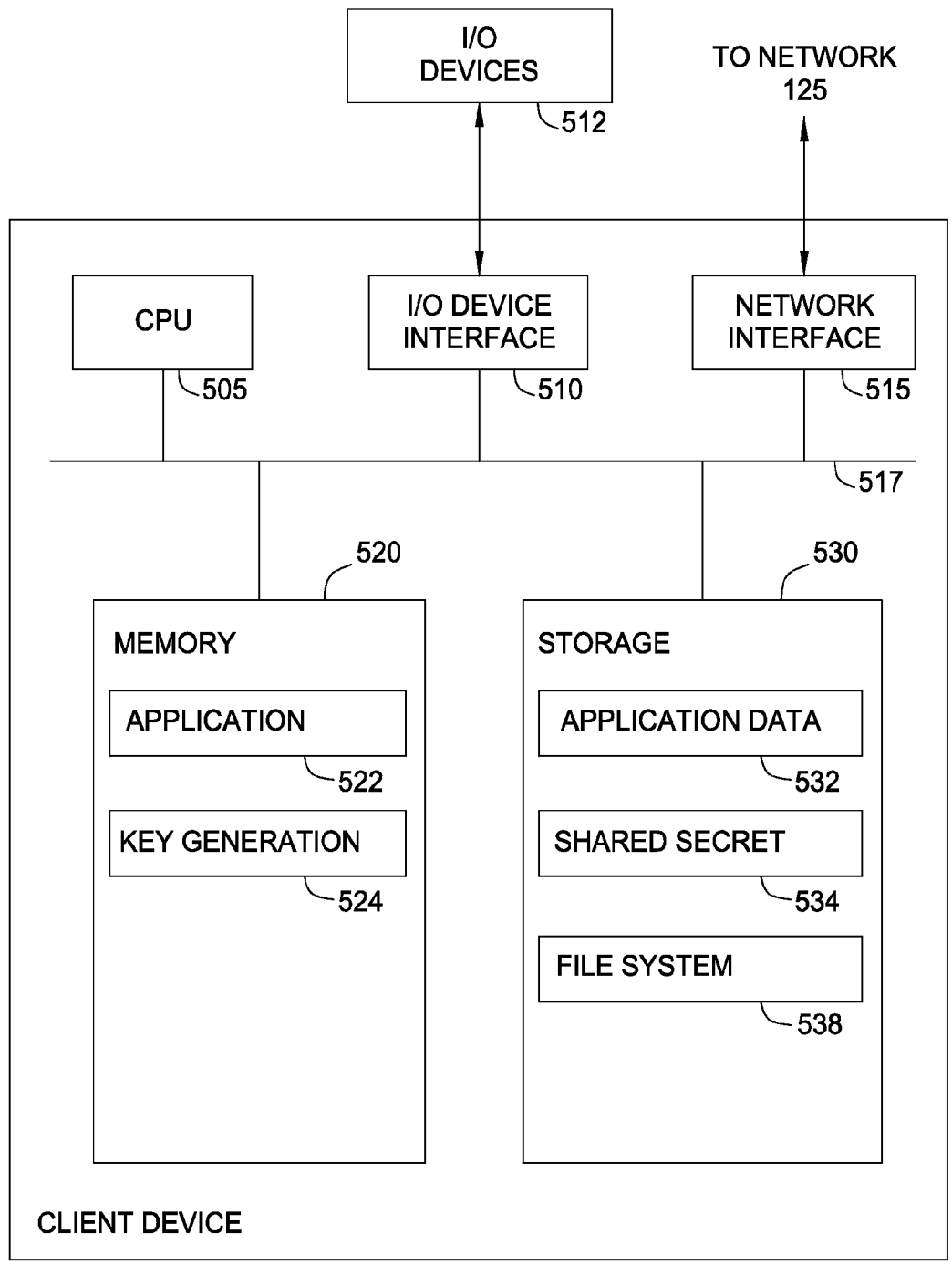
FIG. 5 illustrates an example computing system configured to generate an encryption key using file system attributes as an entropy source, according to one embodiment.

FIG. 5 illustrates an example client computer system 500 configured to generate an encryption key using file system attributes, according to one embodiment. As shown, the client computer system 500 includes, without limitation, a central processing unit (CPU) 505, a network interface 515, a memory 520, and storage 530, each connected to a bus 517. The client computer system 500 may also include an I/O device interface 510 connecting I/O devices 512 (e.g., keyboard, display, and mouse devices) to the client computer system 500.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, or optical storage, network attached storage (NAS), or a storage area-network (SAN).

Figure 6:
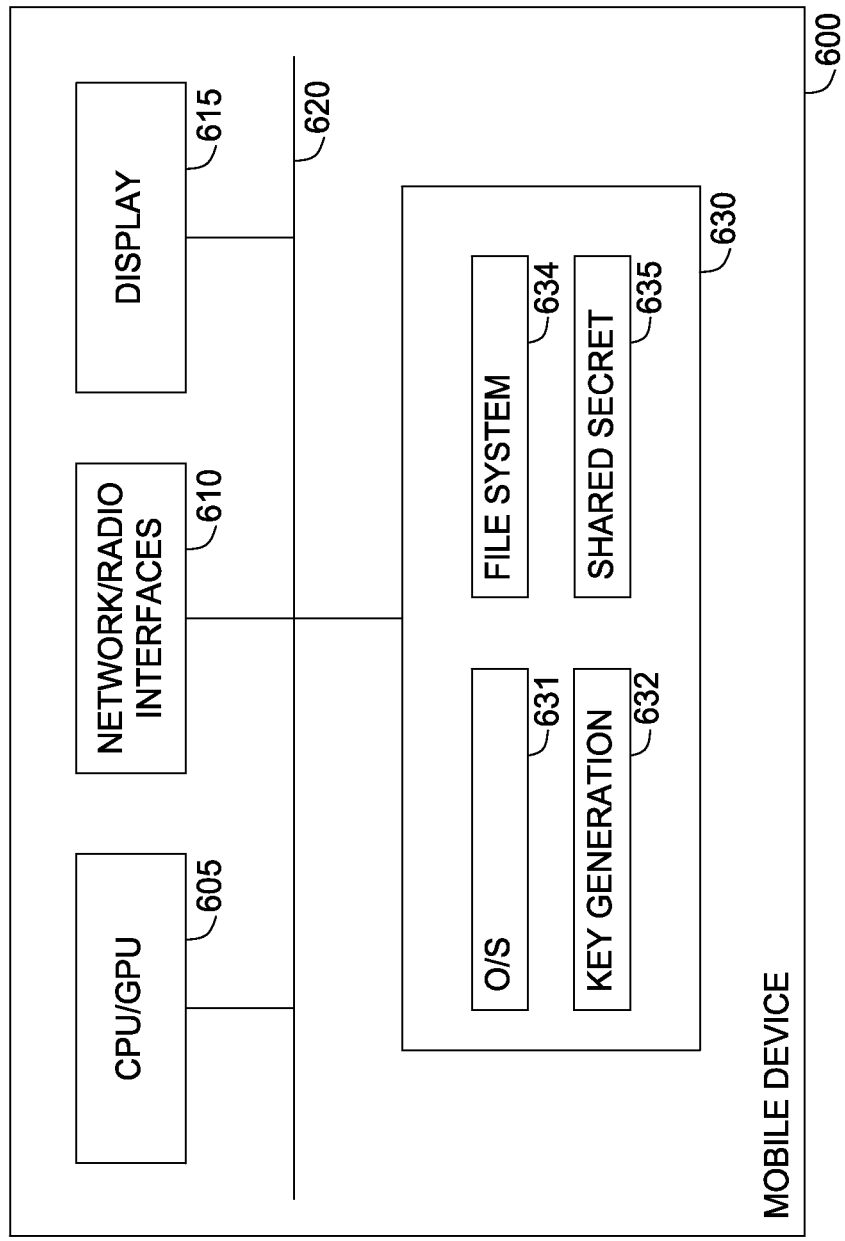
FIG. 6 illustrates an example mobile device configured to generate an encryption key using file system attributes as an entropy source, according to one embodiment.

Illustratively, the memory 520 includes an application/service 522 and a key generation component 524. The storage 530 includes application data 532, a shared secret 534, and a file system 538. The application/service 522 generally provides one or more software applications and/or computing resources accessed by users. A file system 538 includes files and structural attributes of the files, such as inodes. The key generation component 524 may create an encryption key using several sources, one of the sources being the inode of any of the files in file system 538. As noted above, the inode does not have to correspond to the encrypted shared secret or the application performing the encryption. Other sources that the key generation component may include are the CPU ID, keyboard timings from the I/O device interface 510, FIG. 6 illustrates an example mobile device 600 a configured to generate an encryption key using file system attributes, according to one embodiment. In this example, mobile device 600 is used to be representative of a mobile telephone (commonly referred to as a smartphone) with a touch sensitive display 612 and a camera 610. Of course, embodiments of the invention may be adapted for use with a variety of computing devices, including PDAs, handheld video game systems, tablet computers, and other computing devices having a display screen and camera.

As shown, the mobile device 600 includes, without limitation, a central processing unit and graphics processing unit (CPU/GPU) 605, network/radio interfaces 610, an interconnect 620, and a memory 630. Of course, an actual mobile device may include a variety of additional hardware components.

The CPU/GPU 605 retrieves and executes programming instructions stored in the memory 630. Similarly, the CPU/GPU 605 stores and retrieves application data residing in the memory 630. The interconnect 620 is used to transmit instructions and data between the CPU/GPU, storage 630, network interfaces 615, and memory 630. CPU/GPU 605 is included to be representative of a single CPU, multiple CPUs, a single CPU having multiple processing cores, and the like. And the memory 630 is generally included to be representative of memory and storage on a mobile device, e.g., DDR and flash memory spaces.

Illustratively, the memory 630 includes a mobile operating system (O/S) 631, a key generation component 632, and a file system 634, and a shared secret 635. The mobile O/S 631 provides software configured to control the execution of application programs on the handheld device. As described in FIG. 1, a UNIX-based file system 634 includes a plurality of files with corresponding inodes. The shared secret 635 may be created by the mobile device or retrieved from the server. The key generation component 632 may encrypt the shared secret 635 by creating a key using various sources within the device, one source being the inode of a file. Other sources may include a SIM card ID, the CPU ID, etc.

As described, embodiments presented herein provide techniques for encrypting shared secret data in a UNIX-based file system using file system attributes. In encrypting a shared secret, the client device generates a key using a file system attributes value, such as an inode, as a source of entropy. Because the file system attributes value is local to the device and may change upon another device copying the associated file, a cloning application may be unable to replicate the encryption key. Advantageously, this approach does not require server interaction because the client device generates the key and stores the encrypted data locally. Accordingly, embodiments provide a method of encryption that allows a client device to preserve an encrypted shared secret until required for later use.

While the foregoing is directed to embodiments of the present invention, other and further embodiments of the invention may be devised without departing from the basic scope thereof, and the scope thereof is determined by the claims that follow.

What is claimed is:

1. A method for protecting a shared secret, the method comprising:
   generating, by operation of a processor, a key based on at least a file system attribute of a file stored in a file system of a computing device, wherein the file system attribute of the file is an identifier assigned by the file system to uniquely identify the file stored in the file system of the computing device, and wherein the file system attribute is an inode of a file storing the shared secret in the file system;
   encrypting the shared secret with the key; and
   storing the encrypted shared secret in a storage memory on the computing device.

2. The method of claim 1, further comprising removing the key from the storage memory.

3. The method of claim 1, further comprising:
reconstructing the key based on the file system attribute;
decrypting the shared secret with the key; and
performing a computation with the shared secret.

4. The method of claim 3, wherein performing the computation comprises generating a one-time password in authenticating the client device to a server.

5. The method of claim 3, wherein performing the computation comprises sending the shared secret to a server in a challenge-response authentication.

6. The method of claim 3, wherein performing the computation comprises generating a one or more cryptographic keys with the shared secret.

7. A non-transitory computer-readable storage medium storing instructions, which, when executed on a processor, performs an operation for protecting a shared secret, the operation comprising:
generating, by operation of a processor, a key based on at least a file system attribute of a file stored in a file system of a computing device, wherein the file system attribute of the file is an identifier assigned by the file system to uniquely identify the file stored in the file system of the computing device, and wherein the file system attribute is an inode of a file storing the shared secret in the file system;
encrypting the shared secret with the key; and
storing the encrypted shared secret in a storage memory on the computing device.

8. The non-transitory computer-readable storage medium of claim 7, wherein the operation further comprises removing the key from the storage memory.

9. The non-transitory computer-readable storage medium of claim 7, the operation further comprising:
reconstructing the key based on the file system attribute;
decrypting the shared secret with the key; and
performing a computation with the shared secret.

10. The non-transitory computer-readable storage medium of claim 9, wherein performing the computation comprises generating a one-time password in authenticating the client device to a server.

11. The non-transitory computer-readable storage medium of claim 9, wherein performing the computation comprises sending the shared secret to a server in a challenge-response authentication.

12. The non-transitory computer-readable storage medium of claim 11, wherein performing the computation comprises generating a plurality of unique keys with the shared secret.

13. A system, comprising:
a processor and
a memory hosting an application, which, when executed on the processor, performs an operation for protecting a shared secret in a UNIX-based file system, the operation comprising:
generating, by operation of a processor, a key based on a file system attribute of at least a file stored in a file system of a computing device, wherein the file system attribute of the file is an identifier assigned by the file system to uniquely identify the file stored in the file system of the computing device, and wherein the file system attribute is an inode of a file storing the shared secret in the file system,
encrypting the shared secret with the key, and
storing the encrypted shared secret in a storage memory on the computing device.

14. The system of claim 13, wherein the operation further comprises removing the key from the storage memory.

15. The system of claim 13, the operation further comprising:
reconstructing the key based on the file system attribute;
decrypting the shared secret with the key; and
performing a computation with the shared secret.

16. The system of claim 15, wherein performing the computation comprises generating a one-time password in authenticating the client device to a server.

17. The system of claim 15, wherein performing the computation comprises sending the shared secret to a server in a challenge-response authentication.

18. The system of claim 15, wherein performing the computation comprises generating a plurality of unique keys with the shared secret.

\* \* \* \* \*

UNITED STATES PATENT AND TRADEMARK OFFICE
CERTIFICATE OF CORRECTION

PATENT NO. : 9,171,145 B2
APPLICATION NO. : 13/902194
DATED : October 27, 2015
INVENTOR(S) : David Garcia Cervetti It is certified that error appears in the above-identified patent and that said Letters Patent is hereby corrected as shown below:

In the Claims:

Column 10, Claim 12, Line 6, please delete "11" and insert --9-- therefor.

Signed and Sealed this
Sixteenth Day of August, 2016

Michelle K. Lee
*Director of the United States Patent and Trademark Office*